United States Patent
Lasky et al.

[15] 3,646,594

[45] Feb. 29, 1972

[54] PROCESS FOR REMOVAL OF ACIDIC MATERIALS FROM FLUIDS

[72] Inventors: Jack S. Lasky, Verona; Ronald W. Fuest, Kinnelon Borough, both of N.J.

[73] Assignee: The United States of America as represented by the Secretary of the Department of Health, Education and Welfare

[22] Filed: June 11, 1969

[21] Appl. No.: 832,494

Related U.S. Application Data

[63] Continuation-in-part of Ser. No. 783,137, Dec. 11, 1968, Pat. No. 3,564,818.

[52] U.S. Cl..................................................55/59, 55/73, 55/74
[51] Int. Cl...................................................B01d 53/00
[58] Field of Search..............................55/59, 68, 73, 74, 387; 23/2.1; 210/32

[56] References Cited

UNITED STATES PATENTS

| | | | |
|---|---|---|---|
| 3,357,158 | 12/1967 | Hollis | 55/67 |
| 3,420,773 | 1/1969 | Selmeczi | 210/32 |
| 3,429,104 | 2/1969 | Hirshfield | 55/74 |
| 3,498,026 | 3/1970 | Messinger et al. | 55/73 |
| 3,350,075 | 10/1967 | Douglas | 55/73 |
| 3,463,603 | 8/1969 | Freitas et al. | 55/73 |
| 3,502,428 | 3/1970 | Gelbein et al. | 55/73 |

FOREIGN PATENTS OR APPLICATIONS

734,253  5/1966  Canada..................................23/2.1

*Primary Examiner*—Charles N. Hart
*Attorney*—Thomas A. Beck

[57] ABSTRACT

A process for removing Acidic Materials especially $SO_2$ from a fluid such as water, waste gases, etc., which removal is achieved by passing said fluid through a shaped article formed from a polyolefin, a polyester or a nylon in admixture with a nitrogen-containing polymer.

29 Claims, No Drawings

PROCESS FOR REMOVAL OF ACIDIC MATERIALS FROM FLUIDS

CROSS-REFERENCE TO RELATED APPLICATION

This application is a continuation-in-part of application Ser. No. 783,137, filed Dec. 11, 1968, and now U.S. Pat. No. 3,564,818.

The invention described herein was made in the course of work under a grant or award from the Department of Health, Education, and Welfare.

BACKGROUND OF THE INVENTION

1. Field of the Invention

The present invention relates to a process for removing acidic materials from a fluid such as water, waste gases, etc., which removal is achieved by passing said fluid through a shaped article formed from a polyolefin, a polyester or a nylon in admixture with a nitrogen-containing polymer.

2. Prior Art

Present-day air pollution control methods using synthetic high-polymeric materials result in advantages not heretofore obtained, and yet there are inherent difficulties associated with the use of such materials. For example certain high-polymeric materials which have high chemical stability and softening temperatures are being used in liquid and air filter media and bag collectors. When the aforesaid material comprising the filter or bag is saturated with pollutant, the non-regenerable material must be destroyed or discarded. In many cases incineration of the material results in undesirable pollutants from the combustion gases entering the atmosphere. Thus when poly(vinylchloride) is burned harmful chlorine gases including hydrogen chloride are produced.

Thus a desirable air pollution control material is one which is chemically stable to acidic reagents, has a relatively high melting temperature, can remove the pollutants from the air, and can be regenerated for continual successive uses.

SUMMARY OF THE INVENTION

The invention relates to a blend of a polymeric amine-containing material and a melt-spinnable fiber-forming resin which blend may optionally contain a homopolymer of ethylene glycol, derivative thereof or copolymer of ethylene glycol. Such blends are effective in removing acidic materials such as sulfur dioxide, hydrogen chloride, etc., from waste gases produced, for example, by the combustion of fossil fuels, by the smelting of ores, or various chemical manufacturing operations. Fibers produced from the aforesaid blends are capable of being regenerated either by thermal or chemical means to restore the sorptive capacity of the fiber for reuse and as a result of said generation the sulfur dioxide or other valuable byproduct gases may be recovered.

For the sake of convenience and by way of illustration only, reference to and discussion of the acidic materials which are sorbed by the polymer blend in accordance with the present invention will be mainly in terms of $SO_2$ although obviously any acidic material in the fluid to be treated will be sorbed in the same manner as $SO_2$.

We have discovered that when between about 5 percent and 60 percent (and in some instances up to 65 percent) of selected basic-nitrogen containing polymers and optionally a minor amount of an alkylene glycol-containing polymer are added to such thermoplastic resins as polyolefins, polyesters or polyamides the resulting articles made therefrom are capable of sorbing acidic materials. For example, a shaped article containing 60 percent nitrogen polymer and 40 percent polypropylene is capable of sorbing substantially all the $SO_2$ from waste gases containing relatively low $SO_2$ concentrations (e.g., 3,000–10,000 p.p.m.). Furthermore, the $SO_2$ or many of the acidic materials can be desorbed from the articles by raising the temperature above the temperature for sorption, and flushing the sample with an inert gas (e.g., $N_2$) with steam, or by application of a vacuum. Alternatively, the acidic material can be removed by treating the article chemically with, for example, an aqueous basic solution to extract said acidic material into the aqueous phase to form a solution of the salt of the acid.

DESCRIPTION OF PREFERRED EMBODIMENTS

The matrix polymers (i.e., the fiber-forming resins) of the polymeric blend composition to which our invention is applicable comprise three major groupings. One of these groupings is the hydrocarbon polymers, principally the polyolefins, i.e., poly-(1-alkenes) and also copolymers of nonterminal olefins with 1-alkenes and copolymers of two or more 1-alkenes, as well as block and graft copolymers of olefins with each other and with other hydrocarbons. This class would include polyethylene, polypropylene, poly(3-methyl-butene-1), poly(4-methyl-pentene-1), random as well as block copolymers of ethylene and propylene, copolymers of propylene and 3-methyl-butene-1, copolymers of propylene and 4-methyl-pentene-1 and copolymers of any of these monomers with each other and/or with other copolymerizable monomers. The preferred material is polypropylene, by which we mean any polymer of propylene and any copolymer containing predominately polymerized propylene together with any other comonomer copolymerized therewith.

Another major grouping of matrix polymers is the polyesters. These are condensation polymers of dihydric alcohols with organodibasic acids or the anhydrides thereof, particularly dicarboxylic acids, and self-condensation polymers of omega-hydroxycarboxylic acids. It will be understood that the invention is applicable to all film and fiber-forming polyesters, in which the ester linkages are introlinear, including poly(alkylene alkanedioates), poly(cycloalkylenedimethylene alkanedioates), poly(alkylene arenedioates), poly(cycloalkylenedimethylene arenedioates), and analogous materials. Examples of the above-named polyesters are respectively, poly(ethylene adipate), poly(1,4-cyclohexylenedimethylene adipate), poly(ethylene terephthalate), and poly(1,4-cyclohexylenedimethylene terephthalate). The preferred materials in our invention are poly(ethylene terephthalate), poly(ethylene terephthalate-isolphthalate), and poly(1,4-cyclohexylene-dimethylene terephthalate).

The third applicable matrix group is the thermoplastic polyamides, including condensation polymers of a bifunctional amine with a bifunctional carboxylic acid or the anhydride thereof such as poly(hexamethylene adipamide), poly(hexamethylene sebacamide) as well as linear polyamides formed from cyclic compounds, such as polypyrrolidinone, polycaprolactam, polyenantholactam, and copolyamides such as Zytel 61, or an interpolymer of hexamethylene adipamide and hexamethylene sebacamide with caprolactam.

The polymers which may be used as the additive basic-nitrogen containing constituent of the blend:
1. Contain about 1–30 percent basic nitrogen;
2. Preferably possess the basic nitrogen in the form of tertiary amino groups, since these groups are more resistant toward oxidation as well as irreversible side reactions with $SO_2$ and other waste gas constituents; note that generally aliphatic amines are preferred over aromatic amines such as aniline or pyridine derivatives since the basicity of the aliphatic amines is generally higher, resulting in more favorable sorption behavior, (i.e., a more stable $SO_2$-amine complex is formed which allows increased sorption at lower $SO_2$ concentrations, as well as allowing sorption to be carried out at higher temperatures)
3. Must be cospinnable with fiber-forming resins, (i.e., it must be
    a. dispersible in the fiber-forming resin, and
    b. thermally stable enough to withstand the melt-spinning temperature);
4. Possess a sufficiently low vapor pressure so that it will not be carried away by the stream of warm gases during use.
5. Must not be excessively water soluble so that it leaches from the matrix when used in an aqueous solution.

The selected basic nitrogen containing polymers which may be used in the present invention are:

a. Polymers with pendant amino groups as represented by the formula:

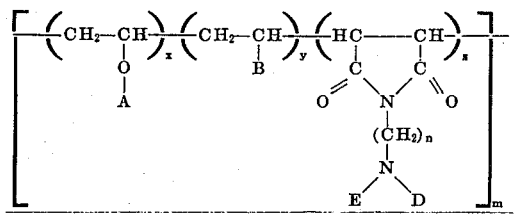

wherein:

A is an alkyl ($C_1$ to $C_{16}$) group

B is an aryl group selected from phenyl, tolyl, xylyl, napthyl

D and E each are lower-alkyl groups ($C_1$ to $C_5$) or compositely represent an alicyclic ring of five carbon atoms $x$ is from 0 to 1

$y$ is 0 to about 0.9

(in all instances $x+y=z$)

$n$ 2–6

$m$ 8–3,000

The preparation of this material is described in copending U.S. Pat. application Ser. No. 770,836.

b. Thermoplastic homopolymers of vinyl-substituted monocyclic and polycyclic pyridine compounds, including quinolines, and thermoplastic copolymers, including graft copolymers, of such compounds with each other and/or with other unsaturated polymerizable compounds. Among the vinylpyridine compounds useful for this purpose in this invention are 2-vinylpyridine, 3-vinylpyridine, 4-vinylpyridine, 3-methyl-6-vinylpyridine, 2-isopropenylpyridine, etc. Polymerizable unsaturated monomers with which the vinylpyridine compounds may be copolymerized include other vinylpyridine compounds, acrylic and methacrylic esters typified by ethyl acrylate and methyl methacrylate, vinylaryl hydrocarbons typified by styrene and vinyltoluenes, olefins and diolefins such as butadine-1,3. Alternatively, the vinylpyridine compound may be graft-copolymerized by well-known methods with a previously formed linear high polymer, typified by polyethylene, polypropylene, polystyrene, and polybutadiene, or with any of the polyesters described above. It is always desirable that the basic nitrogen-containing polymer contain no more than a minor proportion of non-nitrogen containing material copolymerized with the vinylpyridine compound, since only the basic nitrogen (e.g., pyridine) portion of the polymer additive is active as a $SO_2$ sorbent in the matrix polymer. Preferred materials of this class for use in this invention are polymers of at least one vinylpyridine compound, by which is meant homopolymers of vinylpyridine compounds such as poly(2-vinylpyridine), poly(4-vinylpyridine), poly(2-methyl-5-vinylpyridine), poly(2-isopropenylpyridine), etc., copolymers of various vinyl-substituted pyridine compounds with each other, such as copolymers of 2-vinylpyridine and 2-methyl-5-vinylpyridine in any desired proportions, copolymers of 2-vinylpyridine with 2-isopropenyl-pyridine in any desired proportions, copolymers of 2-vinylpyridine with 2-isopropenyl-pyridine in any desired proportions as well as copolymers of three, four, or more of these polymerizable materials. Also included in the meaning of the term are interpolymers of one or more vinylpyridine compounds with other materials copolymerizable therewith, such as styrene.

c. Polymeric amine compounds, which are condensation polymers wherein the amine group is an integral part of the polymer chain. (Note that the addition homopolymers and copolymers wherein pendant groups include or consist of amine groups are those described in (a) above.) Examples of polymeric amine compounds of the first type useful in this invention are the condensation products of epihalohydrins or dihaloparaffins with one or more amine or diamine compound, such as the products disclosed in Belgian Pat. No. 606,306, as for instance the condensation product of dodecylamine, piperazine and epichlorohydrin.

Other basic nitrogen polymers which may be used in our invention are polyurethanes, polyureas, polyamides which contain teritiary amino groups in the polymer chain. The preparation of the aforesaid polymers is readily accomplished using monomers having one ore more tertiary amino groups. Alkylated polyethyleneimines and styrene-allylamine copolymers such as disclosed in U.S. Pat. No. 2,456,428, are also useful in the present invention. Furthermore, mixtures of any of the types of basic nitrogen polymers described above may be used in this invention, provided only that they are mutually compatible.

The amount of said additive basic nitrogen-containing polymers described herein to be added to the polyolefin, polyester or polyamide matrix is between about 5 percent and 65 percent. It is generally preferred to use between about 10 percent and 60 percent additive polymer in the blend if the blend is to be extruded into fibers for final use. It is generally desirable to use as much additive polymer as possible, consistent with good fiber properties.

It is not within the scope of the present invention to use identical polyamides as both the matrix and additive polymer since the additive polymer should contain a greater percentage of basic nitrogen per unit of weight than does the amide matrix polymer in order to achieve an improvement in removing the $SO_2$ pollutants from the fluid.

It has been determined that the addition of alkylene glycols to a blend of between about 5 percent and 20 percent of polymeric compounds containing the matrix polymer and lower levels (5 to 20 percent) of the nitrogen-containing polymer used in the present invention increases the sorptive capacity of an article made therefrom when compared with an article containing the identical amount of matrix and nitrogen-containing polymer and no alkylene glycol polymer. When the limits described above are exceeded the beneficial effect of the alkylene glycol compound on sorptive capacity is less pronounced.

Suitable polymeric compounds containing alkylene glycols are:

1. Homopolymers of alkylene glycols such as poly(ethylene glycol), poly(propylene glycol), poly(butylene glycol) etc.

2. Copolymers of such alkylene glycols as ethylene glycol, propylene glycol or butylene glycol with each other or with other copolymerizable monomers such as diisocyanates, diacids and derivatives thereof etc.

3. Derivatives of the alkylene glycol homopolymers or copolymers described in 1 and 2 above such as polyalkylene glycol alkyl ethers, alkyl-aryl polyalkoxy alcohols, poly alkylene derivatives of long chain fatty acid partial esters of hexitol anhydrides, and poly alkylene glycol carboxylate esters.

The method used to form the blend is not critical provided the additive polymers of the present invention are homogeneously dispersed throughout the polyolefin, polyester, or polyamide. Incomplete mixing results in the formation of aggregates which impair the physical properties of the blend. The blend may be formed by milling or mixing the two or three polymers in liquid, granular, or powder form as the case may be in any suitable mixing apparatus followed by a shaping operation.

In general, when forming the mixture by extrusion, the two or three polymers are first mixed by tumbling. A fine powder is preferred as this increases the degree of homogeneity. The mixture of polymers is fed to the hopper of an extruder and passed through the die at a temperature ranging between 450° and 550° F. depending upon the particular polymers involved. In order to insure complete dispersion, it is desirable to pelletize the extruded strand in a strand chopper and reextrude to form the desired product using standard extrusion techniques.

These compositions of basic-nitrogen polymers, thermoplastic matrix resins and optionally the alkylene glycol containing polymer can be used in any convenient form. For example, the blends can be fabricated into films, sheets, pellets, fibers, etc., to carry out $SO_2$ sorption dependent upon which such physical form would be more advantageous for a particular process to which this method of $SO_2$ removal is applied.

The fibers produced from such blends may be used in the form of felts, knitted or woven mats, or similar assembly. Particulate filtration may also be accomplished at the same time by means of a process, e.g., a moving belt of the $SO_2$-sorbent fiber passes through a zone where the waste gases pass through the belt. It is in this zone that sorption of the $SO_2$ and collection of the particulate matter on the belt occur at the same time. When the belt passes out of this zone, it passes into another zone where desorption of the $SO_2$ and removal and collection of the particulate matter by mechanical means can be accomplished.

Bicomponent fibers are also applicable in our invention wherein one component of the two would be very highly loaded with sorbent, to the point where by itself could no longer be spun into fiber, and combined with a nonloaded or lightly loaded second component to act as a strength member resulting in an advantage in the sorption characteristics.

The process of the present invention is readily performed by exposing the articles, preferably fibers, having the composition as disclosed herein, to the fluid medium containing $SO_2$. Presumably the basic nitrogen atoms in the additive polymer extract $SO_2$ from the medium by sorption. There are essentially no critical limitations with respect to the practice of this process. Naturally the temperature at which the process is run must be consistent with the melting points of the polymers comprising the article.

EXAMPLE 1

Forty grams of 1:1 molar ratio of styrene-dimethylaminopropylmaleimide copolymer (prepared as in U.S. Pat. No. 2,456,428) was mixed with 400 grams of polypropylene (Profax 6623-produced by Hercules and containing heat stabilizers) and extruded in rod form to thoroughly mix the copolymer in the polypropylene resin. The extruded rod was sliced into pellets, and extruded into a eight-filament yarn using a conventional melt-spinning apparatus.

EXAMPLE 2

A 4.06 g. sample of the yarn described in Example 1 was dampened, then placed in a 14 cm. × 10 mm. cylindrical chamber in a temperature-controlled box held at 35° C. A simulated waste gas (10,000 p.p.m. $SO_2$, 32,000 p.p.m. $H_2O$ vapor, balance $N_2$) was passed through this sample at a flow rate of 21.2 ml./minute until the $SO_2$ sorbed by the fiber was 0.014 g./g. Regeneration was accomplished by raising the temperature of the sample chamber to 95° C., and flushing the sample with dry nitrogen at a flow rate of 21.2 ml./minute. Essentially all of the $SO_2$ was recovered. The sorption cycle was then repeated with substantially the same results as in the first cycle.

EXAMPLE 3 (Hercules ⅛

A polypropylene fiber containing 11.1 percent polyethyleneimine was prepared by mixing 40 gm. of polyethyleneimine (Montrek 1000 produced by Dow Chemical Co.) and 320 gm. of polypropylene powder Hercules Profax 6501) and 1.12 gm. of heat stabilizer and extruding the mix into a 1/8-inch rod to thoroughly mix the polymers. The rod was then chopped into pellets, and the pellets were extruded into an eight-filament fiber.

EXAMPLE 4

The fiber prepared according to Example 3 was then treated with a simulated waste gas stream under the same conditions as used in Example 1. The fiber sorbed 0.0252 g. $SO_2$ per gram of fiber.

EXAMPLE 5

A pressed film containing polypropylene and dry styrene-dimethylaminopropylmaleimide copolymer (screened to 60–100 mesh particle size) in the amounts disclosed in Example 1 was treated with a dry simulated waste gas with the following composition:

| | |
|---|---|
| $SO_2$ | 0.34% |
| $CO_2$ | 15.2% |
| $O_2$ | 2.94% |
| $N_2$ | 81.52% |

Fourteen cycles of sorption and regeneration were carried out. The capacity of the sorbent in the film at the beginning of the cycle was 0.117 g. $SO_2$/gm. sorbent in the film and on the 14th cycle a capacity of 0.114 g. $SO_2$/g. sorbent in the film was obtained—a loss of only 2.6 percent in capacity.

EXAMPLE 6

Using the procedures employed in Examples 1 and 2 herein, 50 grams of a polyurea prepared by the reaction of 2,4-tolylenediisocyanate with N-methyl-bis (aminopropyl) amine in admixture with 500 grams of polyethylene terephthalate was treated with a dry nitrogen stream containing 10,000 p.p.m. $SO_2$ at 35° C. A loading of 0.074 g. $SO_2$ per gram of aminopolyurea was obtained.

EXAMPLE 7

Using the procedures described in Examples 1 and 2 herein, 500 grams of Nylon 6 were blended with 85 grams of a terpolymer of styrene, methylvinylether, and dimethylaminopropylmaleimide (prepared using the method disclosed in copending U.S. application Ser. No. 770,836) in the mole ratio of 1:1:2 was treated with a dry nitrogen stream containing 10,000 p.p.m. $SO_2$ at 95° C. A loading of 0.138 g. $SO_2$/gm. terpolymer was obtained.

EXAMPLE 8

A mixture of 120 grams of a styrene-dimethylaminopropylmaleimide copolymer prepared as in Example 1 and 80 grams of polypropylene was extruded in rod form to thoroughly mix the two polymers. The rod was chopped into pellets, and extruded into an eight-filament yarn at 500° F. using melt-spinning apparatus. The yarn was drawn at a ratio of 3:1 at 275° F. The drawn yarn was 18.5 denier per filament, had a tenacity of 1.40 grams/denier and an elongation of 23 percent. The fiber was treated in a chamber using the method of Example 2 with a simulated waste gas of the following composition: $SO_2$ 0.31%, NO 0.041%, $O_2$ 2.70%, $CO_2$ 14.00%, $H_2O$ 8.0%, $N_2$ 75.0%. The $SO_2$ capacity of the fiber at various sorption temperatures on a gram $SO_2$/gram fiber basis was:

TABLE I

| Temperature | $gSO_2$/g. Fiber x 100 |
|---|---|
| 55° C. | 10.4 |
| 95° C. | 1.2 |
| 110° C. | 0.25 |
| 125° C. | 0.07 |

A polypropylene yarn containing no additive polymers and treated in the same manner took up 0.0005 g. $SO_2$ at 55° C. Sorption of $SO_2$ as shown by the results included in Table I is a function of temperature. In addition, sorption is also a function of the concentration of $SO_2$ in the fluid. Increasing the temperature lowers the sorption capacity of the shaped article, whereas an increase in the amount of $SO_2$ in the fluid results in a higher sorption capacity of the shaped article. In the event the temperature of the fluid is increased, and it is desired to obtain the same amount of sorption as before the increase in temperature, one only need place additional fibers (or shaped article) having sorptive capacity in contact with the fluid. The added sorptive capacity provided by the fibers results in removal of substantially all of the $SO_2$ from said fluid at the higher temperature.

In the case of $SO_2$ gas removal it is preferred that the temperature of the fluid not exceed 125° C., although as pointed out above if temperatures above 125° C. are used additional sorptive material should be added.

EXAMPLE 9

This example discloses a typical regeneration procedure using a sweep gas.

A sample of the fiber in Example 8, containing 1.2% $SO_2$ was regenerated by raising the temperature of the sample in said chamber to 125° C. and then flushing the chamber with dry nitrogen at a flow rate of 21.2 ml./minutes. The $SO_2$ was completely removed from the fiber in one-half hour. The completeness of regeneration was determined by both total weight loss of the sample, and by collection of the desorbed $SO_2$ in a standardized iodine solution.

EXAMPLE 10

A sample of the fiber in Example 8, containing 1.2% $SO_2$ was regenerated by flushing the sample in the chamber described in Example 2 with superheated (125° C.) steam at a flow rate of 500 ml./minute. The steam was condensed and collected, and the $SO_2$ was absorbed in iodine solution. The $SO_2$ was completely removed from the fiber in less than 10 minutes.

EXAMPLE 11

A sample of the fiber in Example 8, containing 6.8% $SO_2$ by weight was regenerated by placing the sample in a 0.1 N solution of sodium carbonate at 80° C. for 1 hour. This treatment removed all of the $SO_2$ and restored the sorptive capacity of the fiber.

EXAMPLE 12

A number of polypropylene-dimethylaminopropylmaleimide copolymer fibers having the compositions shown in Table I were prepared and evaluated for $SO_2$ capacity at 55° C. from a simulated flue gas. The denier, tenacity and saturation $SO_2$ capacity of each fiber are also shown in Table II.

TABLE II

| % Styrene-Dimethylamino-propylmaleimide Copolymer (Prepared as in Example 1) | Denier Per Filament | Tenacity g./denier | $SO_2$ Capacity g./g. fiber x 100 |
|---|---|---|---|
| 14.25 | 21.7 | 5.2 | 2.47 |
| 22.2 | 21.9 | 3.0 | 3.93 |
| 33.3 | 18.3 | 2.7 | 5.90 |
| 42.2 | 20.6 | 2.4 | 7.48 |
| 50.0 | 17.5 | 1.4 | 8.77 |

The Table discloses the $SO_2$ capacity of polypropylenestyrene dimethylaminopropylmaleimide copolymer fibers (3:1 draw ratio), from a simulated flue gas having the following composition: $SO_2$ 0.31%, NO 0.041%, $O_2$ 2.70%, $CO_2$ 14.00%, $H_2O$ 8.0%, $N_2$ 75.0% at 55° C.

EXAMPLE 13

A polypropylene fiber containing both styrene-dimethylaminopropylmaleimide copolymer prepared according to Example 1 and polyethylene oxide sold under the name "Polyox WSR-301" sold by Union Carbide and having a molecular weight of about 4,000,000 was prepared. The effect of the added polyethylene glycol upon sorptive capacity is shown in Table III.

TABLE III

| % S-AM[1] | % PEG | $SO_2$ Cap.[3] |
|---|---|---|
| 8.33 | – | 0.0095 |
| 8.33 | 8.33 | 0.0155 |

[1]The conditions for sorption are the same as in Example 12.

[2]S-AM represents styrene-dimethylaminopropylmaleimide copolymer.

[3]$SO_2$ capacity expressed in grams $SO_2$/gram of fiber.

Having thus described our invention, what we claim and desire to protect by Letters Patent is:

1. A process for the removal of acidic materials from a fluid medium containing the same comprising,
   contacting said fluid medium to be treated with a shaped article capable of sorbing said acidic materials prepared from a matrix polymer selected from the group consisting of a polyolefin, a polyester and a polyamide in admixture with between about 5 percent and about 65 percent by weight of a thermally stable polymer containing 1-30 percent basic nitrogen, cospinnable and dispersible in said matrix polymer, said basic nitrogen containing polymer having a low vapor pressure and being at most only slightly water soluble, said basic nitrogen containing polymer being selected from the group consisting of:
   a. thermoplastic homopolymers of vinyl-substituted monocyclic and polycyclic pyridine compounds;
   b. condensation polymers containing tertiary amino groups pendant from the polymer chain;
   c. condensation polymers containing tertiary amino groups as an integral part of the polymer chain; and
   d. addition homopolymers and copolymers having pendant amino groups therefrom,
   resulting in sorption of the acidic materials in said fluid by said shaped article.

2. A process in accordance with claim 1 wherein said basic nitrogen containing polymer possesses the basic nitrogen in the form of aliphatic tertiary amino groups.

3. The process of claim 1 in which said shaped article is regenerated in the presence of heat and steam.

4. The process of claim 1 in which said shaped article is regenerated in the presence of heat and a vacuum.

5. The process of claim 1 in which said shaped article is regenerated in the presence of heat and an inert gas.

6. The process of claim 1 in which said shaped article is regenerated using a basic solution.

7. The process defined in claim 1 in which the matrix polymer is selected from the group consisting of polyethylene, polypropylene, and poly(2-methyl-pentene).

8. The process defined in claim 1 in which the matrix polymer is selected from the group consisting of polyethylene terephthalate, polyethylene-isophthalate, and polyethylene-(isophthlate-terephthalate).

9. The process defined in claim 1 in which the matrix polymer is selected from the group consisting of poly(hexamethylene adipamide), poly(hexamethylene sebacamide), poly(caprolactam), and the interpolymer of hexamethylene adipamide, and hexamethylene sebacamide with caprolactam.

10. The process is in claim 7 in which the nitrogen containing polymer i selected from the group consisting of the (styrene-dimethylaminopropylmaleimide) copolymer, the (styrene-methylvinylether-dimethylaminopropylmaleimide) terpolymer, alkylated polyethyleneimine, the condensation polymer of 2,4-tolylenediisocyanate and N-methyl-bis (aminopropyl)amine.

11. The process defined in claim 8 in which the nitrogen-containing polymer is selected from the group consisting of the (styrene-dimethylaminopropylmaleimide) copolymer, the (styrene-methylvinyletherydimethylaminopropylmaleimide) terpolymer, alkylated polyethyleneimine, the condensation polymer of 2,4-tolylenediisocyanate and N-methyl-bis(aminopropyl) amine.

12. The process defined in claim 9 in which the nitrogen-containing polymer is selected from the group consisting of the (styrene-dimethylaminopropylmaleimide) copolymer, the (styrene-methylvinylether-dimethylaminopropylmaleimide) terpolymer, alkylated polyethyleneimine, the condensation polymer of 2,4-tolylenediisocyanate and N-methyl-bis(aminopropyl)-amine.

13. The process defined in claim 10 in which the shaped article is a fiber containing polypropylene as the matrix polymer between about 10 to 60 percent of the (styrene-dimethylaminopropylmaleimide) copolymer, said percentage based on total weight of the fiber.

14. The process defined in claim 10 in which the shaped article is a fiber containing polypropylene as the matrix polymer and between about 10 percent and 60 percent of polyethyleneimine, said percentage based upon the total weight of fiber.

15. The process defined in claim 11 in which the shaped article is a fiber containing poly(ethylene terephthalate) as the matrix polymer and between about 10 percent and 60 percent of the polyurea reaction product of 2,4-tolylene diisocyanate with N-methyl-bis(aminopropyl)amine, said percentage based upon the total weight of fiber.

16. The process defined in claim 12 in which the shaped article is a fiber containing poly(hexamethylene adipamide) as the matrix polymer and between about 10 percent and 60 percent of the terpolymer of styrene, methylvinylether, and dimethylaminopropylmaleimide, said percentage based upon the total weight of fiber.

17. A process for the removal of acidic materials from a a fluid medium containing same, comprising:
contacting said fluid medium to be treated with a shaped article capable of sorbing said acidic material and prepared from a matrix polymer selected from the group consisting of a polyolefin, a polyester and a polyamide in admixture with between about 5–20 percent by weight of polymeric compounds containing alkylene glycols and about 5–20 percent by weight of a basic nitrogen containing polymer selected from the group consisting of:
a. thermoplastic homopolymers of vinyl-substituted monocyclic and polycyclic pyridine compounds;
b. condensation polymers containing tertiary amino groups pendant from the polymer chain;
c. condensation polymers containing tertiary amino groups as an integral part of the polymer chain; and
d. addition homopolymers and copolymers having pendant amino groups therefrom, resulting in sorption of the acidic materials in said fluid by said shaped article.

18. The process of claim 1 in which said shaped article is regenerated in the presence of heat and steam.

19. The process of claim 18 in which the said shaped saturated article is regenerated using heat and steam.

20. The process of claim 18 in which said shaped article is regenerated using a basic solution.

21. The process of claim 18 in which said shaped article is regenerated in a vacuum in the presence of heat.

22. The process of claim 18 in which said shaped article is regenerated in the presence of heat and an inert gas.

23. The process defined in claim 18 in which the matrix polymer is selected from the group consisting of polyethylene, polypropylene, and poly(2-methyl-pentene).

24. The process defined in claim 18 in which the matrix polymer is selected from the group consisting of polyethylene terephthalate, polyethylene-isophthalate, and polyethylene(isophthalate-terephthalate).

25. The process defined in claim 18 in which the matrix polymer is selected from the group consisting of poly(hexamethylene adipamide), poly(hexamethylene sebacamide), poly(caprolactam), and the interpolymer of hexamethylene adipamide, and hexamethylene sebacamide with caprolactam.

26. The process defined in claim 23 in which the nitrogen containing polymer is selected from the group consisting of the (styrene-dimethylaminopropylmaleimide) copolymer, the (styrene-methylvinylether-dimethylaminopropylmaleimide) terpolymer, alkylated polyethyleneimine, the condensation polymer of 2,4-tolylenediisocyanate and N-methyl-bis(aminopropyl)amine.

27. The process defined in claim 24 in which the nitrogen-containing polymer is selected from the group consisting of the (styrene-dimethylaminopropylmaleimide) copolymer, the (styrene-methylvinylether-dimethylaminopropylmaleimide) terpolymer, alkylated polyethyleneimine, the condensation polymer of 2,4-tolylenediisocyanate and N-methyl-bis(aminopropyl)amine.

28. The process defined in claim 25 in which the nitrogen-containing polymer is selected from the group consisting of the (styrene-dimethylaminopropylmaleimide) copolymer, the (styrene-methylvinylether-dimethylaminopropylmaleimide), terpolymer, alkylated polyethyleneimine, the condensation polymer of 2,4-tolylenediisocyanate and N-methyl-bis(aminopropyl)amine.

29. The process defined in claim 26 in which the shaped article is a fiber, the matrix polymer is polypropylene, the nitrogen containing polymer is a (styrene-dimethylaminopropylmalemide) copolymer and the polymeric compound containing alkylene glycol is polyethylene glycol.

* * * * *